United States Patent
Amacker et al.

(10) Patent No.: US 11,080,314 B2
(45) Date of Patent: *Aug. 3, 2021

(54) DYNAMIC SEARCH SUGGESTION AND CATEGORY SPECIFIC COMPLETION

(71) Applicant: A9.com, Inc., Palo Alto, CA (US)

(72) Inventors: Matthew W. Amacker, San Jose, CA (US); Blair L. Hotchkies, Bellevue, WA (US); Daniel R. Parshall, Redmond, WA (US); Brent Robert Mills, Seattle, WA (US); Anil A. Sewani, Mountain View, CA (US); Daniel E. Rose, Cupertino, CA (US); Alexandru I. Indrei, Seattle, WA (US); Jason P. Patrikios, Seattle, WA (US)

(73) Assignee: A9.COM, INC., Palo Alto, CA (US)

(*) Notice: Subject to any disclaimer, the term of this patent is extended or adjusted under 35 U.S.C. 154(b) by 158 days.

This patent is subject to a terminal disclaimer.

(21) Appl. No.: 15/176,055

(22) Filed: Jun. 7, 2016

(65) Prior Publication Data

US 2016/0283580 A1    Sep. 29, 2016

Related U.S. Application Data

(63) Continuation of application No. 12/580,187, filed on Oct. 15, 2009, now Pat. No. 9,405,841.

(51) Int. Cl.
*G06F 16/30* (2019.01)
*G06F 16/332* (2019.01)
(Continued)

(52) U.S. Cl.
CPC .... *G06F 16/3323* (2019.01); *G06F 16/24578* (2019.01); *G06F 16/954* (2019.01);
(Continued)

(58) Field of Classification Search
CPC .................................................. G06F 17/30643
(Continued)

(56) References Cited

U.S. PATENT DOCUMENTS

| 7,039,635 B1 | 5/2006 | Morgan et al. |
| 8,838,603 B1 | 9/2014 | Djabarov |

(Continued)

FOREIGN PATENT DOCUMENTS

| CN | 101194256 | 6/2008 |
| CN | 101324948 | 12/2008 |

(Continued)

OTHER PUBLICATIONS

CA Examiner's Report dated Jul. 13, 2017, by the Canadian Intellectual Property Office, for Canadian Patent Application No. 2,777,354, 4 pages.

(Continued)

*Primary Examiner* — Jau Shya Meng
(74) *Attorney, Agent, or Firm* — Hogan Lovells US LLP

(57) ABSTRACT

Methods and systems for providing dynamic and category specific search suggestions are provided. According to one embodiment, a partial search query entered by a user can be used to determine a set of relevant search queries, which can be displayed as search suggestions within a search query suggestion window. Each query in the list can be associated with at least one specific category. According to various embodiments, the set of relevant queries and associated categories are dynamically updated as the user modifies the partial search query. Furthermore, each category is selectable by the user such that a detailed list of items associated only with the selected category can be displayed to the user.

20 Claims, 6 Drawing Sheets

(51) Int. Cl.
*G06F 16/954* (2019.01)
*G06F 16/9535* (2019.01)
*G06F 16/2457* (2019.01)
*G06Q 30/06* (2012.01)
*H04L 29/08* (2006.01)

(52) U.S. Cl.
CPC ..... *G06F 16/9535* (2019.01); *G06Q 30/0643* (2013.01); *H04L 67/02* (2013.01)

(58) Field of Classification Search
USPC .......................................................... 707/5
See application file for complete search history.

(56) References Cited

U.S. PATENT DOCUMENTS

| | | | |
|---|---|---|---|
| 2002/0010625 | A1 | 1/2002 | Smith et al. |
| 2003/0195877 | A1 | 3/2003 | Ford et al. |
| 2005/0222987 | A1* | 10/2005 | Vadon .................. G06F 16/907 |
| 2005/0289140 | A1 | 12/2005 | Ford et al. |
| 2006/0206454 | A1 | 9/2006 | Forstall et al. |
| 2007/0060114 | A1 | 3/2007 | Ramer et al. |
| 2008/0016034 | A1 | 1/2008 | Guha et al. |
| 2008/0016101 | A1 | 1/2008 | Ginsburg et al. |
| 2008/0114743 | A1* | 5/2008 | Venkataraman ...... G06F 16/951 |
| 2008/0147641 | A1 | 6/2008 | Leffingwell et al. |
| 2009/0019002 | A1 | 1/2009 | Boulis |
| 2010/0082604 | A1* | 4/2010 | Gutt .................... G06F 16/3326 707/721 |
| 2011/0093488 | A1 | 4/2011 | Amacker |

FOREIGN PATENT DOCUMENTS

| | | |
|---|---|---|
| CN | 101408879 | 4/2009 |
| JP | 11-224254 | 8/1999 |
| JP | 2009-53757 | 3/2009 |
| JP | 2009-54133 | 3/2009 |
| JP | 11-224254 | 5/2011 |
| WO | 2003005235 | 1/2003 |
| WO | 2011/046808 | 4/2011 |

OTHER PUBLICATIONS

CA Examiner's Report dated Jul. 6, 2018, by the Canadian Intellectual Property Office, for Canadian Patent Application No. 2,981,378, 6 pages.
IN Office Action dated Jun. 5, 2018, by the Indian Patent Office, for Indian Patent Application No. 867/KOLNP/2012, 8 pages.
EP Examiner's Report dated Jul. 5, 2017, by the European Patent Office, for European Patent Application No. 10 823 859.03, 5 pages.
CA Examiner's Report dated Mar. 13, 2019, by the Canadian Intellectual Property Office, for Canadian Patent Application No. 2,981,378, 3 pages.
CA Examiner's Requisition dated Mar. 5, 2020, by the Canadian Intellectual Property Office, for Canadian Patent Application No. 2,981,378, 7 pages.
"Non Final Office Action dated Feb. 28, 2012" received in U.S. Appl. No. 12/580,187.
"Final Office Action dated Aug. 23, 2012" received in U.S. Appl. No. 12/580,187.
"Non Final Office Action dated Jan. 16, 2014" received in U.S. Appl. No. 12/580,187.
"Final Office Action dated Aug. 14, 2014" received in U.S. Appl. No. 12/580,187.
"Non Final Office Action dated Apr. 9, 2015" received in U.S. Appl. No. 12/580,187.
"Final Office Action dated Nov. 6, 2015" received in U.S. Appl. No. 12/580,187.
"Notice of Allowance dated Apr. 8, 2016" received in U.S. Appl. No. 12/580,187.
CA Examiner's Report dated Apr. 14, 2014, by the Canadian Intellectual Property Office, for Canadian Patent Application No. 2,777,354, 3 pages.
CN Second Office Action dated Aug. 11, 2014, for Chinese Patent Application No. 201080046883.X, 7 pages.
"Extended European Search Report dated Oct. 2, 2013," PCT Application 10823859.3.
Non Final Office Action dated Jun. 21, 2013, Korean Application 10-2012-701283.
PCT International Preliminary Report on Patentability dated Dec. 1, 2010, for International Application No. PCT/US2010/051864.
PCT International Written Opinion dated Dec. 1, 2010, for International Application No. PCT/US2010/051864.
"Examiner's Search Report dated Feb. 12, 2016", Canada Application 2,777,354, 4 pages.
"Office Action dated Dec. 2, 2013", China Application 201080046883.X.
"Office Action dated Jul. 9, 2013", Japanese Application 2012-534242, 5 pages.
"Notice of Allowance dated Jan. 14, 2014", Japanese Application 2012-534242.
"Notice of Allowance dated Mar. 25, 2015", China Application 201080046883.X.

* cited by examiner

DYNAMIC SEARCH SUGGESTION AND CATEGORY SPECIFIC COMPLETION

CROSS-REFERENCES TO RELATED APPLICATIONS

This application is a continuation of allowed U.S. application Ser. No. 12/580,187 entitled "DYNAMIC SEARCH SUGGESTION AND CATEGORY SPECIFIC COMPLETION," filed Oct. 15, 2009, which is incorporated herein by reference for all purposes.

BACKGROUND

The buying and selling of products or services over computer networks such as the Internet is commonly known as electronic commerce. The continued growth of the Internet has led to a vast increase in the amount of electronically-conducted trade over the years, as online shopping has even become the preferred shopping method for millions of people. Today, virtually any type of product or service is available for purchase on the Internet via online merchants, retailers, and even individual sellers.

Unfortunately, the growth of electronic commerce has also led to a proliferation of available items for sale, making it sometimes difficult for consumers to efficiently search and locate a desired product. Generally, when a user conducts a search for a particular product using a search query, the most related and popular products are ranked and returned in a search result listing. Due to the large number of products offered for sale, however, the desired product may not be one of the most popular products and therefore may be scattered and buried among thousands of more popular search results. For example, a customer searching for a Tiger plush toy may enter "Tiger" or "Tiger toy" into a search query. The merchant system may return more popular search results such as "Tiger Woods Golf video game", "Tiger Operating System", or "Tiger Electric Guitar." As a result, the user will undesirably have to either sort through the many more popular results, or provide a refined and more specific search query. In some cases, the user may not know the proper spelling or exact name of the desired item, leading to more frustration in performing a conventional product search.

Some online merchants sell products within several departments or categories, such as books, music, videos and DVDs, toy and games, electronics, etc. These categories are meant to assist potential customers in quickly narrowing a search for a particular product. Prior to entering the search query, the customer must select the appropriate department for the desired product. Often times, however, the customer is unsure what category a particular product may fall under. As such, a method and system for allowing users to quickly and efficiently search and locate a particular product is needed.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to performing an online search for a specific item using a search query. As used herein, the term "item" can refer to anything that can be ordered, purchased, rented, used, or otherwise consumed and/or accessed via a network request or electronic submission, such as a product, service, or system. A search can include any appropriate request sent over an appropriate system or network, such as a request submitted to a web page over the Internet or a message sent via a messaging system to a content provider, for example. The term "marketplace" will be used herein to generically refer to an electronic environment, such as a Web site or virtual sales network, for example, wherein items can be offered for consumption (e.g., sale, rent, or lease) and customers can agree to terms to obtain those items.

Though in some instances it can be desirable to display the most relevant items and categories that are directly related to a query being searched, it can be difficult for a computer system to accurately determine the relatedness of an item category to a specified query. For example, it might be difficult for a computer system to determine that a user submitting a query for "The Secret" might be more interested in the Blu-ray movie starring Lili Taylor, or an episode from the TV series "The Office", rather than the numerous and more popular self-help books having a similar title.

Prior to discussing details of illustrative embodiments, it should be understood that the following description is presented largely in terms of steps and operations that may be performed by conventional computer components, such as those described elsewhere herein. These computer components, which may be grouped in a single location or distributed over a wide area, generally include computer processors, memory storage devices, display devices, input devices, etc. Memory storage devices provide one or more data stores where a comprehensive number of item descriptions represented as search index entries are contained. One skilled in the art would appreciate that subsets of items exists within the data store, the subsets corresponding to divisions within the data store. In circumstances where the computer components are distributed, the computer components are accessible to each other via communication links. Further, although the present invention will be described with regard to illustrative embodiments, one skilled in the relevant art will appreciate that the disclosed embodiments are illustrative in nature and should not be construed as limiting.

Figure 1:
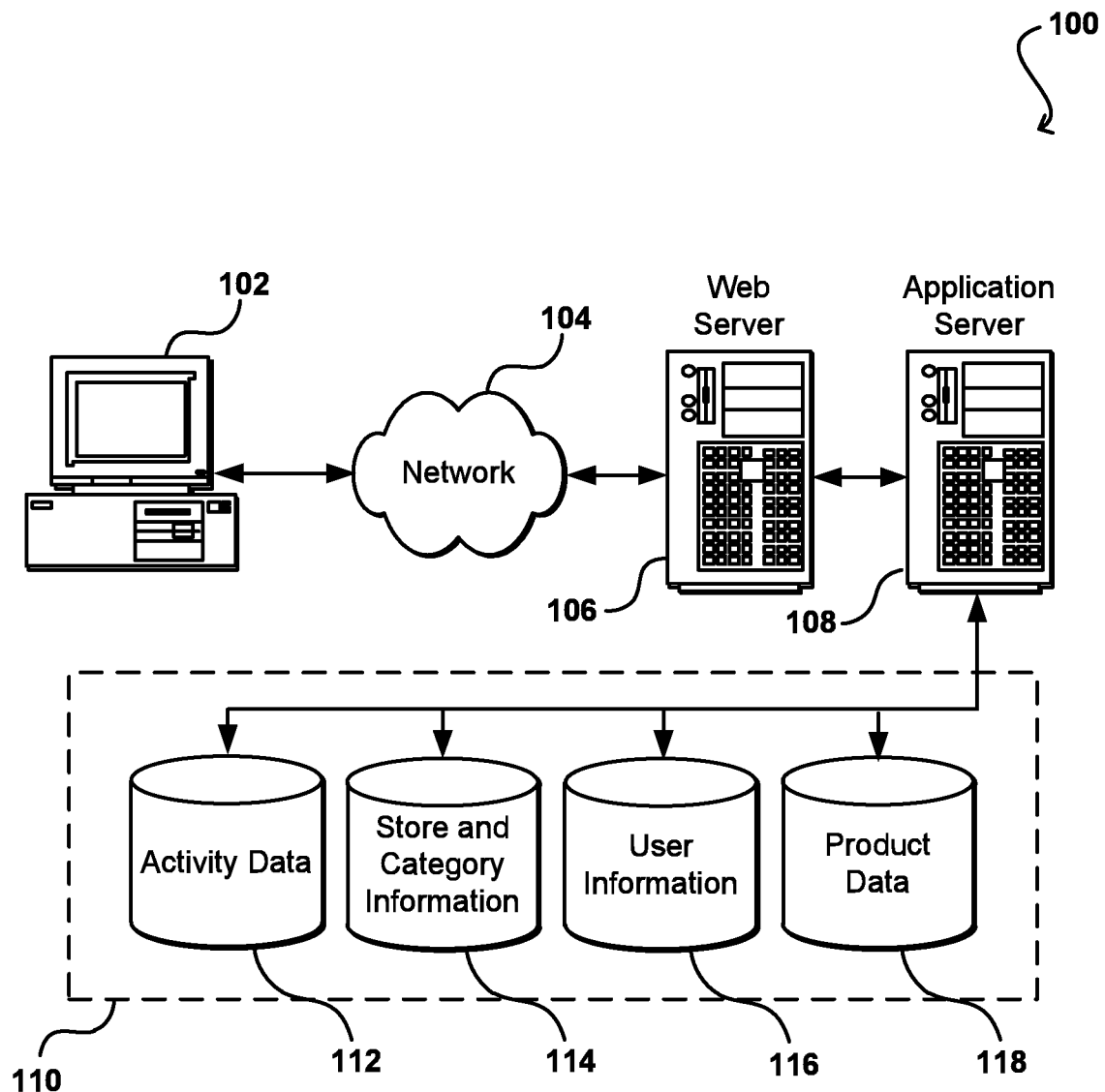
FIG. 1 illustrates an environment in which various embodiments can be implemented.

FIG. 1 illustrates an example of an environment 100 for implementing aspects in accordance with various embodiments. As will be appreciated, different environments may be used, as appropriate, to implement various embodiments. The environment 100 shown includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

The illustrative environment further includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of Hypertext Markup Language (HTML) for at least one web page using hypertext transfer protocols. The handling of all requests and responses, as well as the delivery of content between the client device 102 and the application server 108, can be handled by the Web server.

Each server can include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for activity data 112, store and category information 114, user information 116, and product data 118. It should be understood that there can be many other aspects that may need to be stored in the data store, such as for page image information and access right information, which can be stored in any of the above listed mechanisms as appropriate or in additional mechanisms in the data store 110. The data stored will depend upon the user thereof, as in environments providing for electronic searching of a data store can include index data or other such information. The data store 110 is operable, through logic associated therewith, to receive instructions from the application server 108, and obtain, update, or otherwise process data in response thereto. In one example, a user might submit a search request for a certain type of content. In this case, the data store might access the user information to verify the identity of the user, and access the ownership information to obtain information about content which the user has previously purchased. The information then can be returned to the user, such as in a results listing on a web page that the user is able to view via a browser on the user device 102.

Figure 2:
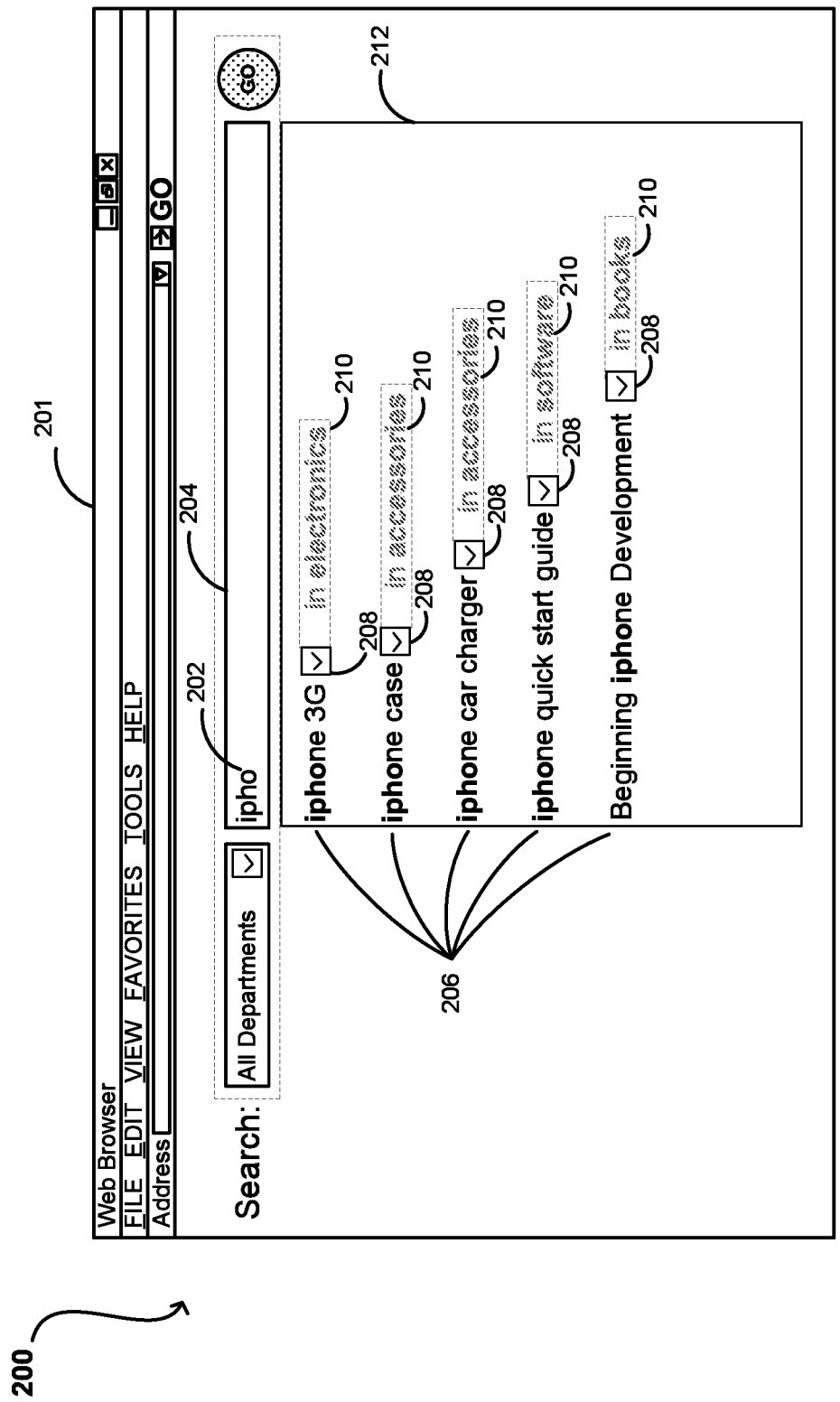
FIG. 2 illustrates a first example display of a web page and search suggestion window including relevant items and a category selection means in accordance with one embodiment.

FIG. 2 illustrates an example of a graphical user interface window 200 for a browser application on a client device that can be provided in accordance with one embodiment. Here, the window 200 displays a page 201 in which a user is able to view information for items and categories relating to a search query. While an electronic marketplace or merchant site is used for purposes of explanation, it should be understood that this is merely an example and that any electronic environment where a user or other entity is able to view or otherwise receive or access multiple instances of items and/or categories can benefit from, and be used with, various embodiments described herein. For example, search results returned from the application server can be loaded and presented in a similar fashion, whether those results are returned locally or across a network. In the example of FIG. 2, a user may perform a search for an item by entering or typing a search query within in a search box 204. As used herein, the term "item" can refer to anything that can be ordered, purchased, rented, used, or otherwise consumed and/or accessed via a network request or electronic submission, such as a product, service, or system. In some embodiments, a user can be identified to the system using any appropriate approach known in the art, such as by having the user login to the site, or by storing a cookie for the user's browser.

In the example shown in FIG. 2, the user has entered four alphanumeric characters, "ipho", as a partial search query 202 within a search box 204. According to some embodiments, once two or more characters are entered by the user, code on the client device, such as JavaScript for the page, can contact an application server or other such component that quickly and dynamically retrieves relevant item and/or category data and displays at least some of this information as search or query suggestions in a search query completion window 212. A detailed description of the relevance determination and item retrieval process will be discussed in subsequent paragraphs. The search query completion window 212 may be a drop-down window, panel, or other such component positioned directly below, or adjacent to, the search box 204 so as to provide simple viewing and comparison of the suggested search queries. As shown in FIG. 2, the query completion window 212 includes a list of relevant terms or phrases 206 associated with the partially entered search query 202. In this example, the partial search query "ipho" returns a list of relevant terms and phrases 206 that begin with or at least contain the partially entered query, such as "iPhone 3G", "iPhone case", "iPhone car charger", "iPhone quick start guide", and "Beginning iphone Development" (iPhone® is a registered trademark of Apple Corporation). The list of suggested queries 206 shown in search query completion window 212 can change dynamically as the user updates the search query, such as by adding or deleting characters in search box 204. According to some embodiments, the item list 206 is ordered by relevance, from the most relevant items to the least relevant items. As the search query changes, the listing of items can change as the relevance to the updated query changes. Though the example of FIG. 2 only shows a list of five relevant queries, the suggested query list is not limited thereto. For example, the query list 206 may contain ten or more relevant items, or only two relevant items. In the present embodiment, each item displayed in the search query completion window 212 further includes at least one selector 208. The selector 208 can be any appropriate user-selectable element, such as a drop-down menu or text box. When the user interacts with selector 208, such as by clicking selector 208 or by positioning the mouse pointer over selector 208, a category descriptor 210 associated with the selected item can be displayed or updated adjacent to the selector 208 within the search suggestion window 212. In the present embodiment, the category descriptor 210 is not displayed prior to user interaction with the selector 208, although in other embodiments the descriptor may be displayed in a way that indicates a value has not yet been specified, such as by using "grayed out" text. Furthermore, the category descriptor 210 represents a link to a specific category store such that activation of the link or selection of the element, by a mouse click or similar action, will open and send the user directly to a category store web page, or other display screen, for purchase of relevant items or products.

Figure 3:
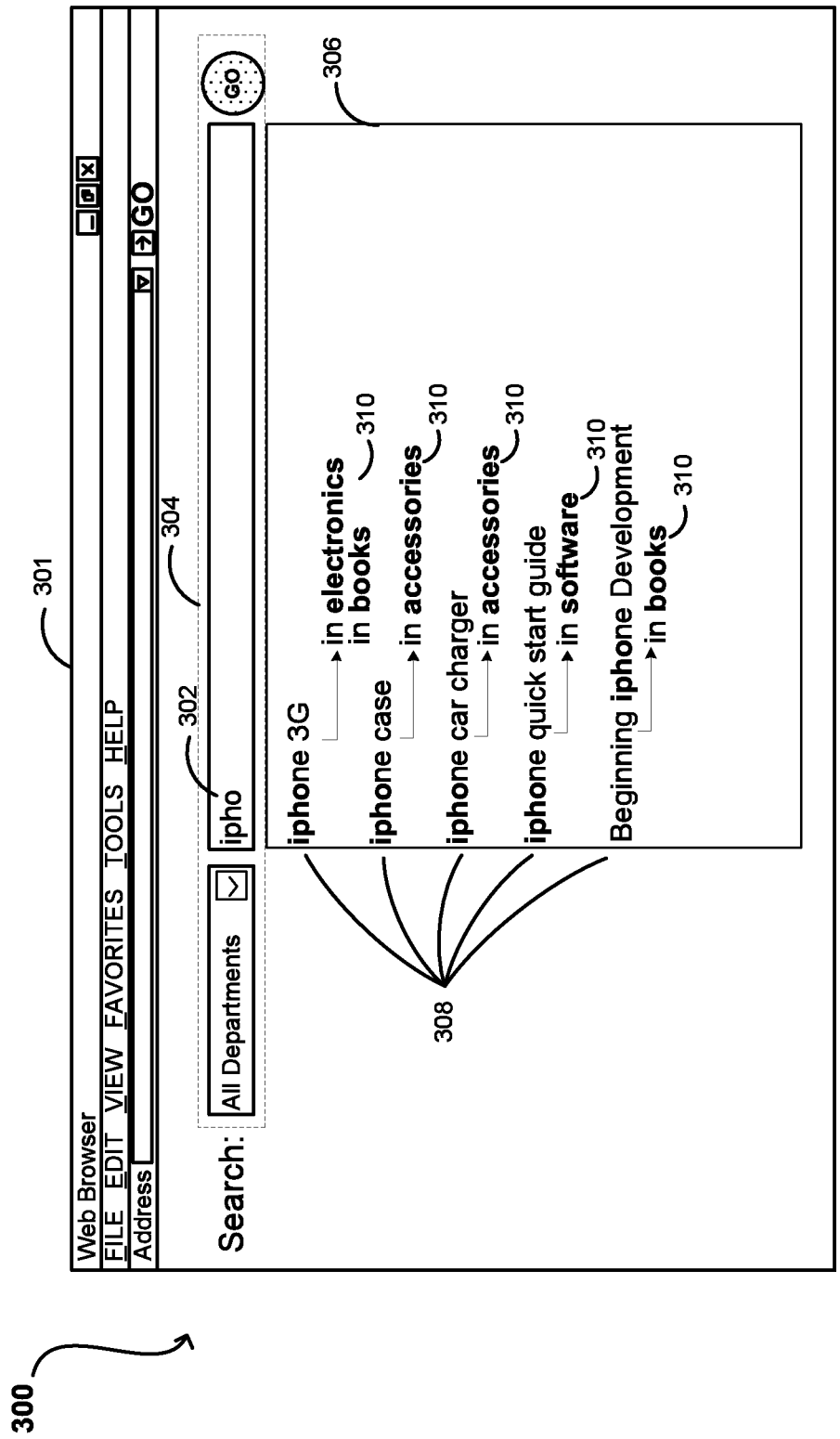
FIG. 3 illustrates a second example display of a web page and search suggestion window including relevant items and associated categories in accordance with one embodiment.

FIG. 3 illustrates a second example display of a page and search suggestion window including relevant items and associated categories in accordance with one embodiment. As in the previous embodiment, the window 300 includes a page 301 including a search box 304 for manual entry of a search query. Upon input of at least a partial search query by a user, a search query suggestion window 306 and a list of relevant queries 308 are displayed as in FIG. 2. Unlike the previous embodiment, however, each query in the list of queries 308 includes at least one associated category descriptor 310 that is automatically displayed in the search query suggestion window 306. As in the previous embodiment, the list of relevant queries 308 can change dynamically as the user adds or deletes characters in search box 304. Furthermore, and as shown in FIG. 3, a relevant query 308 may be associated with multiple search categories 310, e.g. the suggested search query "iphone 3g" is associated with both the "electronics" category and the "books" category. According to this embodiment, a user can easily view the search suggestion window and immediately indentify the most relevant items and appropriate category or categories based on the current search query.

Figure 4:
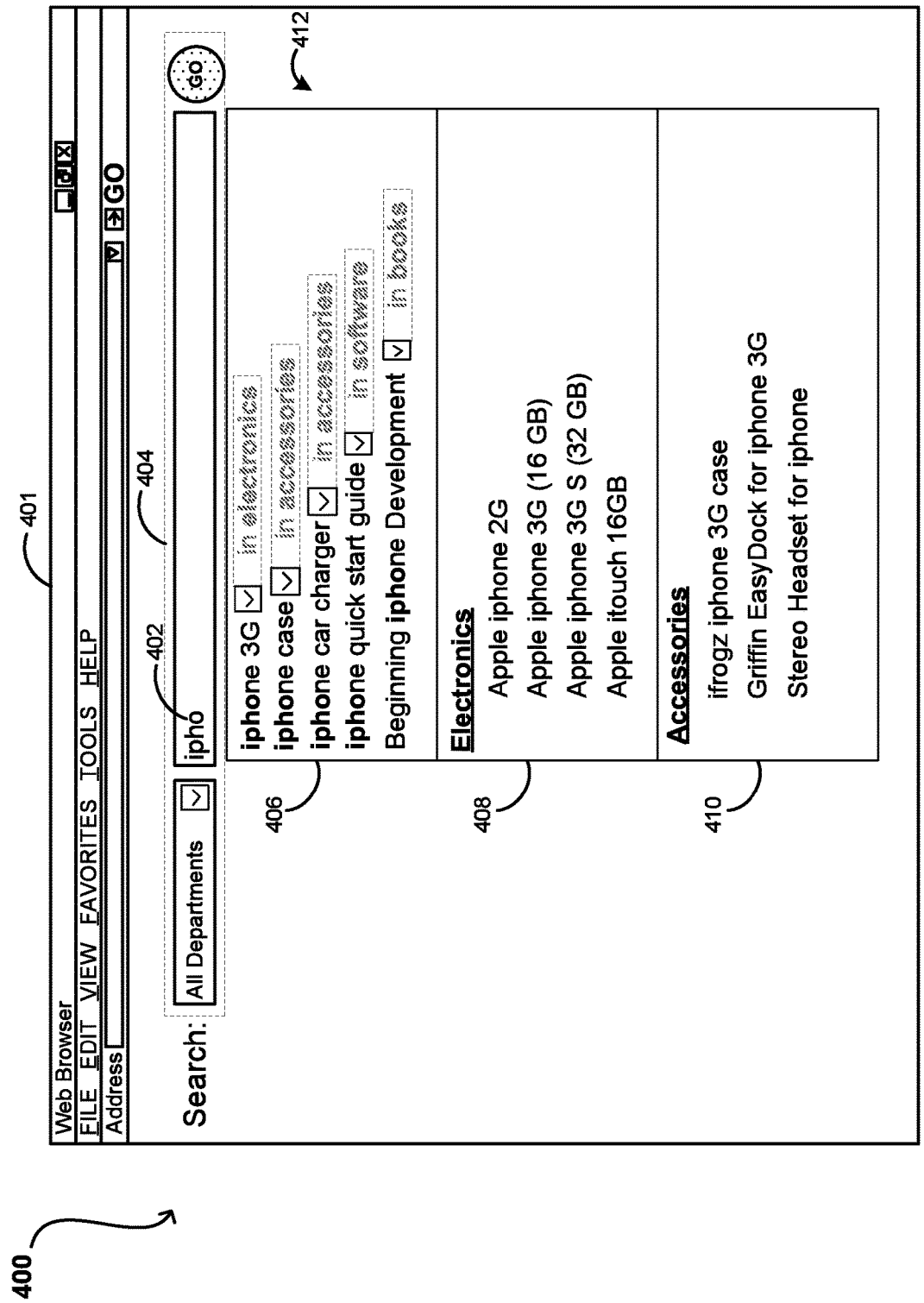
FIG. 4 illustrates a third example display of a web page and search suggestion window having multiple segments in accordance with one embodiment.

FIG. 4 illustrates a third example display of a page and search suggestion window having multiple search segments in accordance with one embodiment. As in the previous embodiments, window 400 includes a web page 401 and a text box 404 for entering a search query. According to the embodiment shown in FIG. 4, upon entry of at least a partial search query in the search box 402, search suggestion window 412 displays three separate search suggestion segments 406, 408, and 410 as part of a drop-drown window. As shown here, the first (topmost) search suggestion segment 406 includes a general list of relevant queries as in the embodiments discussed above, while the second (center) and third (lowermost) search suggestion segments 408 and 410 respectively, provide category-specific search suggestions. According to the example of FIG. 4, a partial search query "ipho" will return an ordered list of relevant queries for display in search suggestion segment 406 such as "iphone 3G", "iphone case", "iphone car charger", etc. The first search suggestion segment in this embodiment is shown to include an associated category descriptor, although in other embodiments associated category descriptors may not appear in the first search suggestion segment. The second search suggestion segment 408 is positioned below the item-specific search suggestion segment 406 (although other relative arrangements can be used as well) and includes relevant queries associated only with the "Electronics" category, i.e. the listed queries are category-specific. The third search suggestion 410 is positioned below the second segment and includes relevant queries associated only with the "Accessories" category, such as "ifrogz iphone 3G case" and the "Griffin EasyDock for iphone 3G." In the present example, search suggestion window 412 only includes two category-specific segments 408 and 410 arranged by category relevance. Based on the exemplified search query, the "Electronics" category is determined to be more relevant than the "Accessories" category. However, search suggestion window 412 may include several category-specific segments arranged alphabetically, or in any other reasonable and presentable manner. Accordingly, this embodiment enables a user to simultaneously view a list of the most relevant queries, as well as a list of particular queries associated with specific categories.

Figure 5:
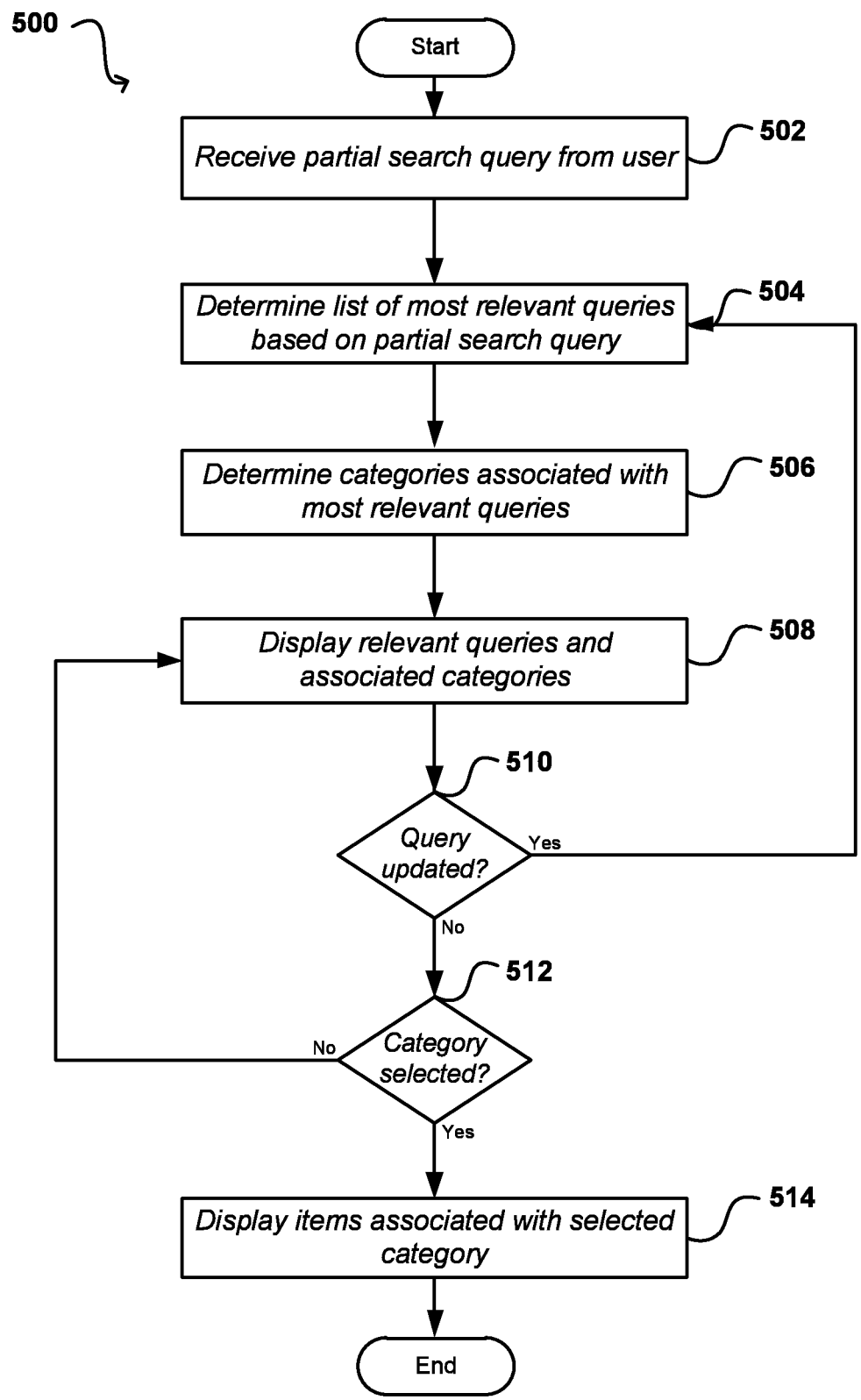
FIG. 5 illustrates steps of a process for providing dynamic and category specific search suggestions based on a partial search query in accordance with one embodiment.

FIG. 5 illustrates steps of a process 500 for providing dynamic and category-specific search suggestions based on at least a partial search query in accordance with one embodiment. Although this example is described with respect to items and item categories, it should be understood that such a process can be used with any indirectly-related content, and categories of such content, that can be determined and provided to a user. Further, although the process is described with respect to a search query, it should be understood that indirectly related content can be determined for any appropriate term, item, element, or object, such as a specific product or piece of content. Further, the elements listed can be performed in various order in different embodiments, and fewer, additional, or alternative elements can be used in different embodiments and discussed or suggested herein.

In this example process, a partial query of at least two characters is obtained in step 502. Based on the input characters, a list of the most related and relevant products is determined in step 504. In various embodiments, the application server matches the current search query with past search history for determining which items are most relevant. Search history analysis may involve a database look up for which items received the most activity when given the particular, or similar, search term. Such activity may include the number of times a user has executed a search query for an item, the number of mouse clicks on a particular link associated with an item, the number of times the item was added to a virtual shopping cart, or even the number of direct online purchases of the item. Based on the results, items and categories that meet a minimum relatedness can be mapped to a search query for use in selecting items and categories to be displayed to users submitting subsequent searches for such items.

Given the search query and list of relevant items, the application server determines categories associated with the particular item in step 506. For example, a search query for "iPhone" would return categories such as electronics, books, software, wireless accessories, etc. Each category may hold a value relating to its affinity, or relevance. In the "iphone" example above, more relevant categories such as electronics, would receive a higher value than less relevant categories such as books or movies. In addition, more than one category may be associated with an individual item in the list of relevant items. For instance, the "The Sims" game by Electronic Arts™ may be associated with the video game category and the computer software category.

After the set of the relevant queries and categories are determined, in step 508 the set is ordered by relevance score and displayed as search query suggestions in the search suggestion window as shown in FIGS. 2-4. The item list within the search suggestion window remains static on the web page until the query is updated by the user in step 510, or until the user selects one of the displayed categories in step 512. If the query is updated in step 510, then the application server again determines the list of relevant items and categories such that the search suggestion window updates dynamically as the user types. If the user selects a particular category in step 512, the application server launches a new web page, or display screen, listing all relevant items for the selected category in step 514.

There can be several advantages to providing dynamic and category specific search suggestions. For example, such a method and system can be used to quickly display the most relevant search queries and associated categories based on only a few character inputs from the user. In the example above, a user enters "ipho" and can conveniently see several items and categories that may be of interest. In particular, the application server returns several queries and categories relating to "iphone" prior to the completion of the search term, and prior to the user actually executing a search query by activating a search button. As such, users are able to efficiently navigate a merchant website and promptly locate a specific category and product of interest.

Figure 6A:
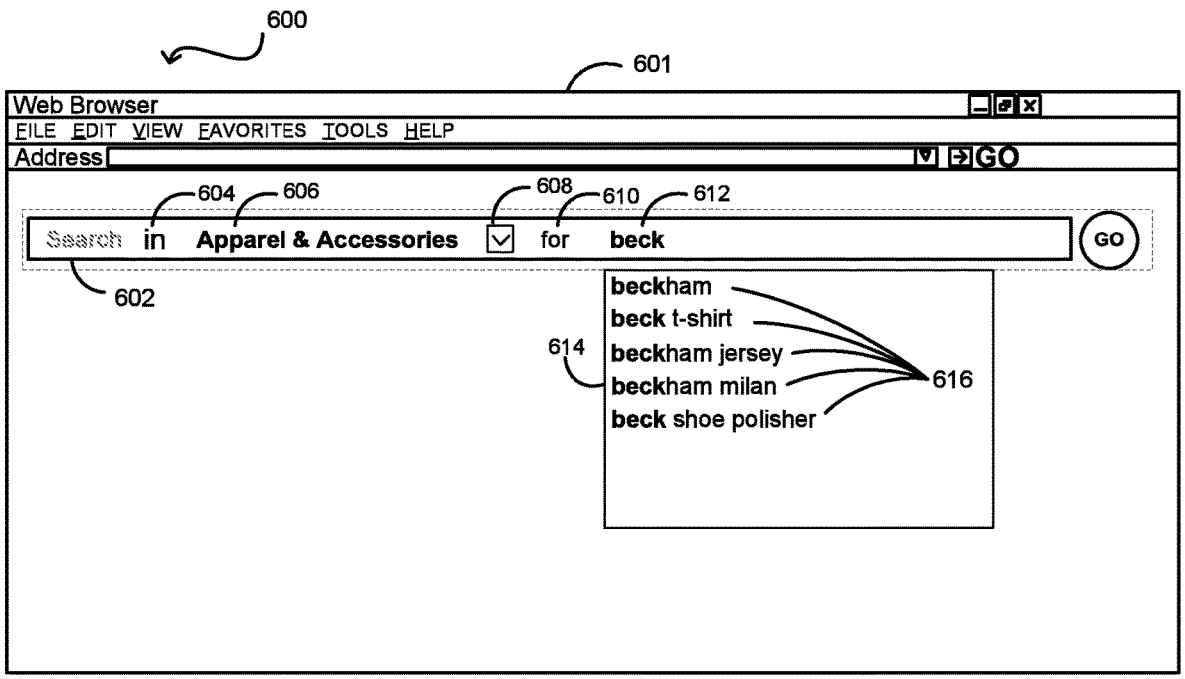
FIGS. 6A and 6B illustrate example displays of a web page and a sentence search box in accordance with one embodiment.
Figure 6B:
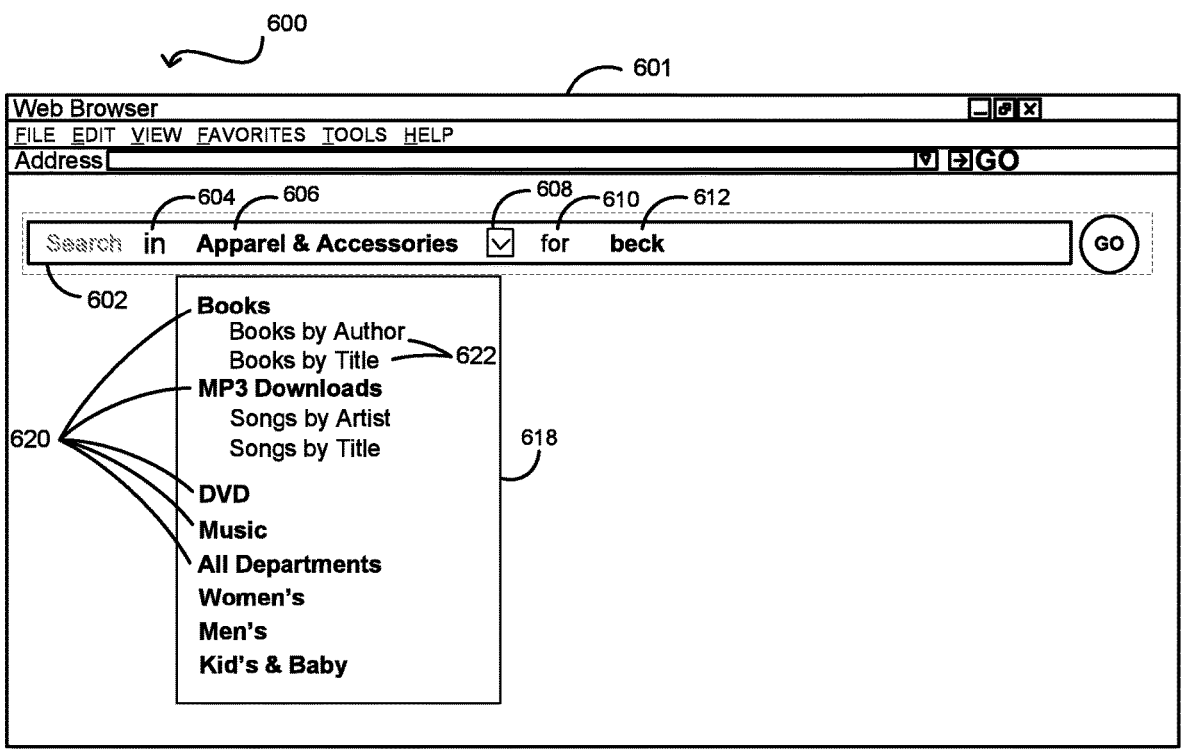

FIGS. 6A and 6B are example displays of a web page and inline search sentence feature according to one embodiment. As shown here, window 600 includes a web page 601 having a search box 602 for inputting a search query. In contrast to the previous embodiments, the search query to be executed by the search engine comprises prepositions 604 and 610, an instant search category 606, and a search term 612 as modifiable terms within the search box 602. The instant search category 606 includes a category selector 608 positioned adjacent the instant search category 606 and preposition 610. Category selector 608 includes a button, or similar activation mechanism, for displaying a list of suggested search categories. As shown in FIG. 6A, the instant search category is "Apparel & Accessories," and the prepositions 604, 610 are "in" and "for" respectively. Accordingly, the user and the processing engine read the partial search query as an incomplete sentence "Search in Apparel & Accessories for." In this embodiment, the user inputs characters "beck" as the search term 612 so as to complete the sentence and form a search query capable of execution against a set of data by the processing engine. Concurrently with the entry of the search term characters by the user, the processing engine retrieves a plurality of search terms and displays the most relevant search terms 616 in a drop-down search suggestion window 614 as in the previous embodiments. As shown here, the search term 612 "beck" and the search category "Apparel & Accessories" returns suggested search terms 616 including "beckham", "beck t-shirt", "beckham jersey", etc. If the user selects, by a mouse click or similar action, any one of the relevant search terms 616, the processing engine immediately executes the search query based on the selected search term 612, the propositional phrases 604 and 610, and the instant search category 606.

Still further, upon activation of the category selector 608 by the user, a drop-down category suggestion window 618 and list of suggested search categories 620 is displayed below the instant search category 606 as shown in FIG. 6B. In particular, the list of suggested search categories 620 in the category suggestion window 618 is configured to change dynamically based on the search term 612 input by the user. For example, if no search term is entered by the user; all categories may be listed in the category suggestion window 620 such that "All Departments" is set as the instant search category 606. On the other hand, as a user enters characters of the search term 612, the processing engine determines the most relevant search categories based on the current search term 612. In the example of FIG. 6B, the search term "beck" is input as the current search term 612. When category selector 608 is activated by the user, the search category suggestion window 618 is activated and displays a list of relevant search categories 620 for the current search term including "Books", "MP3 Downloads", "DVD", and "Music", in addition to the display of the instant search category "Apparel & Accessories." If the user selects, by a mouse click or similar action, any one of the relevant search categories 620, the processing engine immediately executes the search query based on the current search term 612, the propositional phrases 604 and 610, and the selected search category 606.

Furthermore, prepositions 604 and 610 are positioned respectively before and after the instant search category 604 within search box 602. In some embodiments, however, preposition 604 may be omitted. The prepositions help to bring grammatical structure for the search sentence and may dynamically change based on the search category and search term. For example, a search query for "Search in Books for Stephen King," where "in" and "for" are the prepositions, will return slightly different search results than a search query "Search for Books by Stephen King"—the former being a book title search while the latter is an author search. In the embodiment shown in FIG. 6B, the preposition 610 is directly coupled (not modifiable) with the search categories so as to produce category and phrase suggestions 622 within a suggested search category 620, e.g. "Books by Author" and "Books by Title" within the "Books" category. Alternatively, instead of the preposition being directly coupled to a search category suggestion, the prepositions can dynamically change within the search box as the user enters a search term. For example, the search box could read "search for books by," and then dynamically change to "search in books for" as the search term changes so as to produce a more relevant and grammatically correct search query sentence.

Alternatively, the user can manually input the entire search query sentence into the search box instead of just the search term. For example, given a particular preposition, the processing engine can instantly determine relevant categories based on the typed preposition and English grammatical rules, and display the relevant categories to the user. For instance, typing the phrase "search for", "search in", or "search with" could narrow the set of relevant search categories that are displayed as suggestions to the user. Furthermore, the inline search as a sentence feature of the present embodiment is not limited to items, services, or products of an online marketplace. For example, entry of an address location as a search term may change the search box to read "search for restaurants near" or "search for movies near." In addition, the search query sentence and prepositions are not limited to the English language nor English grammatical rules, respectively. For example, the sentence-structured searching feature of the present embodiment can be similarly utilized for a number of different foreign languages, in which the preposition may become omitted or gender-specific.

The dynamic search as a sentence feature helps to solve particular problems associated with certain conventional search methods. One problem arises when a user performs a search query in a particular category, and thereafter, unknowingly and undesirably, performs a second search in the same search category. For example, a user may enter a search query for "Levi's® jeans" in the search box and not realize that the current category is still "Books" from a previous search. The processing engine will likely return search results of several books that relate to "Levi's® jeans", rather than the various styles of "Levi's® Jeans" within the "Apparel" category. According to the present embodiment, if the search term is changed such that another category becomes more relevant, the view of the instant category is automatically altered so as to alert the user that the instant category may not be the only or most relevant category in view of the new search term. This change can be illustrated by a change in text color, font size, or font style, or the like. As a result, users can instantly see suggestions of other relevant search categories that may help to provide a more desirable search query.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving one or more characters associated with a search query to be executed against a set of data;
   determining a plurality of search queries relevant to the one or more characters, the determination including at least one attempt to match the search query with historical search activity, and each of the plurality of search queries being in a completed form;
   associating at least one of the plurality of search queries with at least one of a plurality of search categories determined to be relevant to the search query, the at least one of the plurality of search categories including a selection element for selecting a search category associated with the search query, wherein the selection element is configured to automatically update the plurality of search queries within a selected search category upon selection of the selected search category, the update including at least one search query in the plurality of search queries relevant to the one or more characters;
   determining an ordered set of the plurality of relevant search queries and at least one of the plurality of associated search categories based at least in part on a relevance value meeting a threshold value, the relevance value indicating a strength of an association of the plurality of relevant search queries to the at least one of the plurality of associated search categories;
   providing for display, as the one or more characters are received, a search suggestion window including the ordered set of one or more of the plurality of relevant search queries within the at least one of the plurality of associated search categories; and
   executing a selection of the one or more of the plurality of relevant search queries or the at least one of the plurality of search categories against the set of data in the associated search category.

2. The computer-implemented method of claim 1, wherein each search query in the set of one or more of the plurality of search queries includes a selection element for selecting a search category associated with the search query.

3. The computer-implemented method of claim 2, further comprising:
   receiving a selection of the search category via the selection element;
   retrieving available items associated with the search category; and
   providing for display a category view corresponding to the search category, the category view providing one or more available items for purchase.

4. The computer-implemented method of claim 3, wherein the category view is displayed in a web page.

5. The computer-implemented method of claim 1, further comprising:
   receiving at least one change to the one or more characters associated with the search query;
   updating the set of one or more of the plurality of search queries and at least one of the plurality of search categories in response to the at least one change to create an updated set; and
   providing the updated set for display in the search suggestion window.

6. The computer-implemented method of claim 1, wherein the search suggestion window further includes:
   a first suggestion segment configured to display a set of relevant search queries; and
   a second suggestion segment configured to display a set of category-specific queries.

7. The computer-implemented method of claim 1, further comprising:
   ordering the set of one or more of the plurality of search queries and at least one of the plurality of search categories using a scoring system from most relevant to least relevant.

8. A system, comprising:
   a processor; and
   a memory device including instructions that, when executed by the processor, cause the processor to:
   receive one or more characters associated with a search query to be executed against a set of data;
   determine a plurality of search queries relevant to the one or more characters, the determination including at least one attempt to match the search query with historical search activity, and each of the plurality of search queries being in a completed form;
   associate at least one of the plurality of search queries with at least one of a plurality of search categories determined to be relevant to the search query, the at least one of the plurality of search categories including a selection element for selecting a search category associated with the search query, wherein the selection element is configured to automatically update the plurality of search queries within a selected search category upon selection of the selected search category, the update including at least one search query in the plurality of search queries relevant to the one or more characters;
   determine an ordered set of the plurality of relevant search queries and at least one of the plurality of associated search categories based at least in part on a relevance value meeting a threshold value, the relevance value indicating a strength of an association of the plurality of relevant search queries to the at least one of the plurality of associated search categories;
   provide for display, as the one or more characters are received, a search suggestion window including the ordered set of one or more of the plurality of relevant search queries within the at least one of the plurality of associated search categories; and
   execute a selection of the one or more of the plurality of relevant search queries or the at least one of the plurality of search categories against the set of data in the associated search category.

9. The system of claim 8, wherein each search query in the set of one or more of the plurality of search queries includes a selection element for selecting a search category associated with the search query.

10. The system of claim 9, wherein the memory device further includes instructions that, when executed by the processor, cause the processor to:
   receive a selection of the search category via the selection element;
   retrieve available items associated with the search category; and
   provide for display a category view corresponding to the search category, the category view providing one or more available items for purchase.

11. The system of claim 10, wherein the category view is displayed in a web page.

12. The system of claim 8, wherein the memory device further includes instructions that, when executed by the processor, cause the processor to:
   receive at least one change to the one or more characters associated with the search query;
   update the set of one or more of the plurality of search queries and at least one of the plurality of search categories in response to the at least one change to create an updated set; and
   provide the updated set for display in the search suggestion window.

13. The system of claim 8, wherein the search suggestion window further includes:
   a first suggestion segment configured to display a set of relevant search queries; and
   a second suggestion segment configured to display a set of category-specific queries.

14. The system of claim 8, wherein the memory device further includes instructions that, when executed by the processor, cause the processor to:
   order the set of one or more of the plurality of search queries and at least one of the plurality of search categories using a scoring system from most relevant to least relevant.

15. A non-transitory computer readable storage medium including instructions stored thereon which, when executed by at least one processor, cause the processor to:
   receive one or more characters associated with a search query to be executed against a set of data;
   determine a plurality of search queries relevant to the one or more characters, the determination including at least one attempt to match the search query with historical search activity, and each of the plurality of search queries being in a completed form;
   associate at least one of the plurality of search queries with at least one of a plurality of search categories determined to be relevant to the search query, the at least one of the plurality of search categories including a selection element for selecting a search category associated with the search query, wherein the selection element is configured to automatically update the plurality of search queries within a selected search category upon selection of the selected search category, the update including at least one search query in the plurality of search queries relevant to the one or more characters;
   determine an ordered set of the plurality of relevant search queries and at least one of the plurality of associated search categories based at least in part on a relevance value meeting a threshold value, the relevance value indicating a strength of an association of the plurality of relevant search queries to the at least one of the plurality of associated search categories;
   provide for display, as the one or more characters are received, a search suggestion window including the ordered set of one or more of the plurality of relevant search queries within the at least one of the plurality of associated search categories; and
   execute a selection of the one or more of the plurality of relevant search queries or the at least one of the plurality of search categories against the set of data in the associated search category.

16. The non-transitory computer readable storage medium of claim 15, wherein each search query in the set of one or more of the plurality of search queries includes a selection element for selecting a search category associated with the search query.

17. The non-transitory computer readable storage medium of claim 16, wherein the instructions that, when executed by the processor, further cause the processor to:
   receive a selection of the search category via the selection element;
   retrieve available items associated with the search category; and
   provide for display a category view corresponding to the search category, the category view providing one or more available items for purchase.

18. The non-transitory computer readable storage medium of claim 15, wherein the instructions that, when executed by the processor, further cause the processor to:
   receive at least one change to the one or more characters associated with the search query;
   update the set of one or more of the plurality of search queries and at least one of the plurality of search categories in response to the at least one change to create an updated set; and
   provide the updated set for display in the search suggestion window.

19. The non-transitory computer readable storage medium of claim 15, wherein the search suggestion window further includes:
   a first suggestion segment configured to display a set of relevant search queries; and
   a second suggestion segment configured to display a set of category-specific queries.

20. The non-transitory computer readable storage medium of claim 15, wherein the instructions that, when executed by the processor, further cause the processor to:
   order the set of one or more of the plurality of search queries and at least one of the plurality of search categories using a scoring system from most relevant to least relevant.

* * * * *